US006674755B1

(12) United States Patent
Potter et al.

(10) Patent No.: US 6,674,755 B1
(45) Date of Patent: Jan. 6, 2004

(54) METHOD AND SYSTEM FOR PROTECTION SWITCHING IN A TELECOMMUNICATIONS NETWORK

(75) Inventors: Thomas A. Potter, Petaluma, CA (US); R. Douglas Howson, Santa Rosa, CA (US)

(73) Assignee: Cisco Technology, Inc., San Jose, CA (US)

( * ) Notice: Subject to any disclaimer, the term of this patent is extended or adjusted under 35 U.S.C. 154(b) by 721 days.

(21) Appl. No.: 09/607,771

(22) Filed: Jun. 30, 2000

(51) Int. Cl.[7] ............................................. H04M 11/06
(52) U.S. Cl. ....................................... 370/395; 370/237
(58) Field of Search ........................... 349/219, 220.01, 349/221.01, 221.03; 370/237, 395, 905, 907

(56) References Cited

U.S. PATENT DOCUMENTS

| | | | |
|---|---|---|---|
| 5,570,362 A | 10/1996 | Nishimura | 370/60.1 |
| 5,577,039 A | 11/1996 | Won et al. | 370/60.1 |
| 5,734,653 A | 3/1998 | Hiraiwa et al. | 370/395 |
| 5,848,067 A | 12/1998 | Osawa et al. | 370/394 |
| 5,943,339 A | 8/1999 | Mauger | 370/397 |
| 6,243,382 B1 | 6/2001 | O'Neill et al. | 370/395 |
| 6,404,782 B1 | 6/2002 | Berenbaum et al. | 370/522 |
| 6,442,167 B1 | 8/2002 | Aramaki et al. | 370/395.43 |

OTHER PUBLICATIONS

Bellcore, *ATM Virtual Path Ring Functionality in SONET—Generic Criteria (A Module of TSGR, FR–440)*, Generic Requirements GR–2837–CORE, Issue 4, Feb. 1998 (167 pages), Feb. 4, 1998.

ITU–T Recommendation I.363, "B–ISDN ATM Adaptation Layer (AAL) Specification," Mar. 1993, 100 pages.

Bellcore GR–253–CORE, "Synchronous Optical Network (SONET) Transport Systems: Common Generic Criteria," Issue 2, Dec. 1995 (with rev. Jan. 1999), 788 pages.

ATM Forum, "Circuit Emulation Service Interoperability Specification," version 2.0, Jan. 1997, AF-V-TOA–0078.000, 101 pages.

ATM Forum, "Specifications of (DBCES) Dynamic Bandwidth Utilization—in 64Kbps Time Slot Trunking over ATM—Using CES," Jul. 1997, AF–VTOA–0085.000, 32 pages.

Bellcore GR–2837, "ATM Virtual Path Ring Functionality in SONET—Generic Criteria," Feb. 1998, 154 pages.

Power PC, POWERQUICC™, MPC860 User's Manual Motorola, © 1996, 1,143 pages, Jul. 1998.

International Telecommunication Union, Series I: Integrated Services Digital Network, "B–ISDN operation and maintenance principles and functions," Feb. 1999, 116 pages.

"About ATM" www.atmforum.com/atmforum/library/notes 1, 2, 3, 4 and 5 printed Aug. 30, 1999, 5 pages.

U.S. patent application Ser. No. 09/390,420, entitled "Method and System for Transmitting Traffic Having Disparate Rate Components," filed Sep. 3, 1999, 30 pages. (0368).

(List continued on next page.)

*Primary Examiner*—Creighton Smith
(74) *Attorney, Agent, or Firm*—Baker Botts L.L.P.

(57) ABSTRACT

A method for protection switching in a telecommunications network is provided that includes receiving a plurality of primary and secondary sub-streams. Each primary sub-stream corresponds to a redundant secondary sub-stream. Each sub-stream has an associated priority level. Protection switching is provided for the sub-streams based on the priority levels.

24 Claims, 2 Drawing Sheets

OTHER PUBLICATIONS

U.S. patent application Ser. No. 09/419,204, entitled "Method and System for Distributed Processing of Traffic in a Telecommunications Node," filed Oct. 15, 1999, 37 pages. (0369).

U.S. patent application Ser. No. 09/452,753 entitled "Method and System for Transporting Synchronous and Asynchronous Traffic on a Synchronous Bus of a Telecommunications Node," filed Dec. 1, 1999, 124 pages. (0363).

U.S. patent application Ser. No. 09/452,759, entitled "Fused Switch Core and Method for a Telecommunications Node," filed Dec. 1, 1999, 114 pages. (0364).

U.S. patent application Ser. No. 09/452,746, entitled "Method and System for Transporting Synchronous and Asynchronous Traffic on a Bus of a Telecommunications Node," filed Dec. 1, 1999, 122 pages. (0365).

U.S. patent application Ser. No. 09/452,829, entitled "Rate Adjustable Backplane and Method for a Telecommunications Node," filed Dec. 1, 1999, 119 pages. (0366).

U.S. patent application Ser. No. 09/452,830, entitled "Asynchronous Transfer Mode (ATM) Switch and Method for a Telecommunications Node," filed Dec. 1, 1999, 119 pages. (0367).

U.S. patent application Ser. No. 09/452,751, entitled "Synchronous Switch and Method for a Telecommunications Node," filed Dec. 1, 1999, 119 pages. (0372).

U.S. patent application Ser. No. 09/452,751, ENTITLED "Synchronous Switch and Method for a Telecommunications Node," filed Dec. 1, 1999, 119 pages. (0372).

U.S. patent application Ser. No. 09/628,532, entitled "Method and System for Reprogramming Instructions for a Switch," filed Jul. 31, 2000, 35 pages. (0370).

U.S. patent application Ser. No. 09/657,068, entitled "Method and System for Processing Traffic in an Access Network," filed Sep. 7, 2000, 41 pages. (0362).

"Asynchronous Transfer Mode (ATM) Switching," printed from www.cisco.com on Aug. 27, 2002, 19 pages.

METHOD AND SYSTEM FOR PROTECTION SWITCHING IN A TELECOMMUNICATIONS NETWORK

TECHNICAL FIELD OF THE INVENTION

This invention relates generally to the field of telecommunications and more particularly to a method and system for protection switching in a telecommunications network.

BACKGROUND OF THE INVENTION

Telecommunication networks often include protection switching architectures to maximize circuit availability. Protection schemes are dependent upon specific application requirements, as well as industry requirements. For Synchronous Optical-Network (SONET) fiber optic systems, for example, protection switching requirements include the ability to detect failures within 10 milliseconds and to complete a switch within 50 milliseconds after detection.

For Asynchronous Transfer Mode (ATM) networks, a typical means for protection switching includes an ATM virtual path ring. The ATM virtual path ring has a plurality of nodes that communicate with each other through two streams of traffic: a working traffic stream traveling around the virtual path ring in a first direction and a protect traffic stream traveling around the virtual path ring in the opposite direction for back-up. Each message is transmitted in both directions and thus received by a destination node from both the working and protect streams.

Each node in the ring generally includes two separate circuit packs to process the two traffic streams. The circuit packs determine which one of the circuit packs will process the traffic and thus determine whether traffic from the working or protect traffic stream will be used. In making this determination, the circuit packs communicate information back and forth. Messaging latency and/or limited bandwidth for communication between circuit packs may delay the determination. Because of this, there is a limit on the number of ATM traffic streams that can be concurrently supported while the protection switching requirements are maintained.

SUMMARY OF THE INVENTION

In accordance with the present invention, a method and system for protection switching in a telecommunications network are provided that substantially eliminate or reduce disadvantages and problems associated with previously developed systems and methods. In particular, each circuit pack has priority level data for the traffic stream, which allows the stream to be processed in order of priority in the event of a failure.

In one embodiment of the present invention, a method for protection switching in a telecommunications network is provided that includes receiving a plurality of primary and secondary sub-streams. Each primary sub-stream corresponds to a redundant secondary sub-stream. Each sub-stream has an associated priority level. Protection switching is provided for the sub-streams based on the priority levels.

Technical advantages of the present invention include providing an improved method for protection switching in a telecommunications network. In particular, each circuit pack for a routing terminal has a database for storing priority level data for the traffic stream. As a result, the traffic stream may be segmented based on priority in the event of a failure. Accordingly, the higher priority traffic, such as voice traffic, may be processed first in order to meet time requirements for switching, while the lower priority traffic with less strict time requirements, such as non-real time traffic, is processed after the high priority traffic.

Another technical advantage of the present invention includes providing a high capacity telecommunications node and ring with compliant protection switching for voice traffic. In particular, voice and other time sensitive and high priority traffic is identified and processed first in response to a failure in order to meet switching requirements. Lower priority traffic is processed after the higher priority traffic. As a result, the number of ATM or other suitable flows concurrently supported may be increased as a result of the prioritization because data traffic is not interfering with the requirements for voice protection switching times.

Other technical advantages will be readily apparent to one skilled in the art from the following figures, description, and claims.

BRIEF DESCRIPTION OF THE DRAWINGS

For a more complete understanding of the present invention and its advantages, reference is now made to the following description taken in conjunction with the accompanying drawings, wherein like numerals represent like parts, in which.

DETAILED DESCRIPTION OF THE INVENTION

Figure 1:
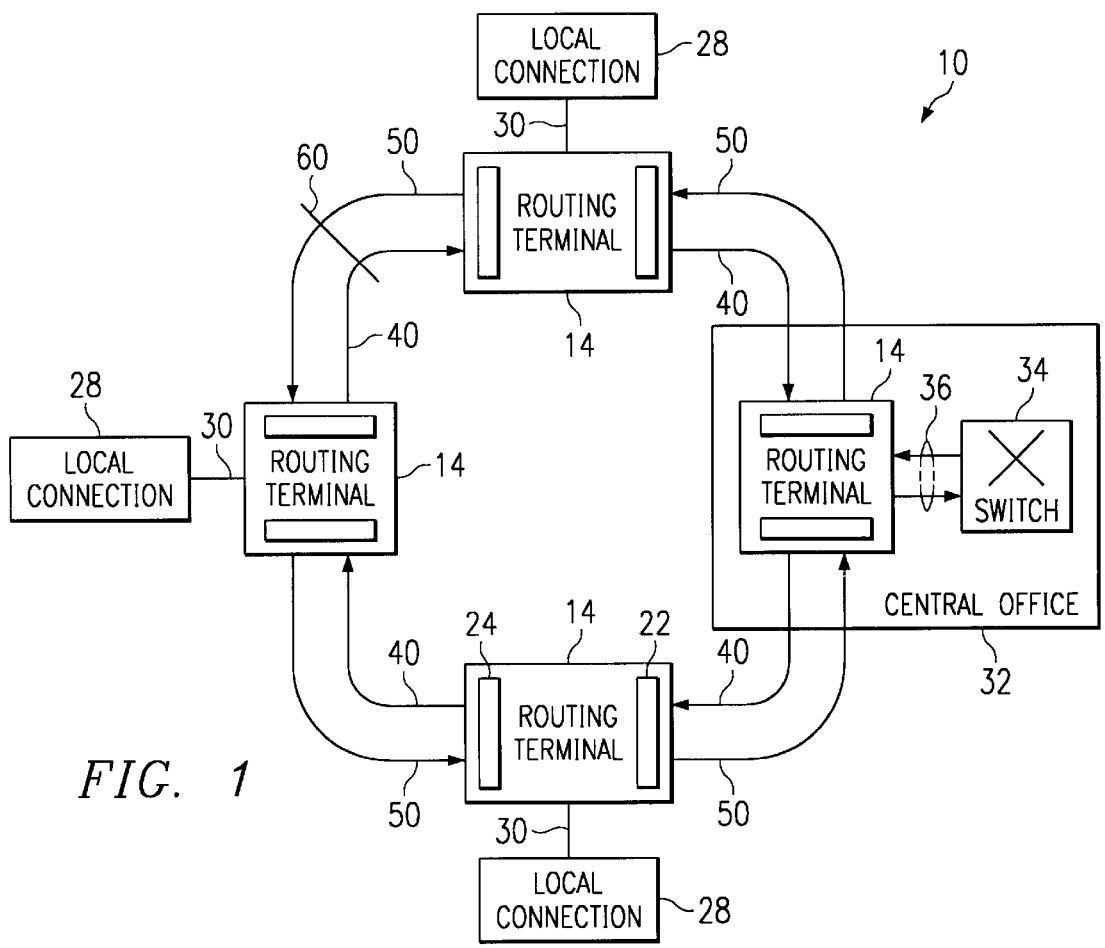
FIG. 1 is a block diagram illustrating a telecommunications network utilizing protection switching in accordance with one embodiment of the present invention.

FIG. 1 is a block diagram illustrating a telecommunications network 10 utilizing protection switching in accordance with one embodiment of the present invention. According to the embodiment shown in FIG. 1, the network 10 comprises an Asynchronous Transfer Mode (ATM) virtual path ring in which a plurality of routing terminals 14 communicate through a ring architecture. Although the embodiment shown includes four routing terminals 14, it will be understood that the network 10 may comprise any suitable number of routing terminals 14 without departing from the scope of the present invention. Each routing terminal 14 may comprise an add/drop multiplexer or other suitable device for adding traffic, dropping traffic and passing through traffic.

According to an exemplary embodiment, the routing terminals 14 comprise an east circuit pack 22 and a west circuit pack 24 to optimize signal quality, as described in more detail below. The circuit packs 22 and 24 each comprise hardware, software, and/or firmware operable to receive traffic and to transmit or discard traffic, as described in more detail below. According to one embodiment, the circuit packs 22 and 24 comprise a protection pair group of SONET Optical Carrier level N concatenated (N=3, 12, 48, 192) (OC-Nc) circuit packs. The routing terminals 14 also comprise power supplies, one or more switching cards, and other suitable hardware and/or software for providing communication (not shown in FIG. 1). Each routing terminal 14 also communicates with a local connection 28 over a line 30. In accordance with one embodiment, the local connection 28 comprises a telephone, a PBX system or other suitable system capable of communicating with the routing terminal 14. The line 30 comprises a DS0, DS1, or other suitable signal over twisted pair wire or other suitable communication link.

For the embodiment shown in FIG. 1, the network 10 also comprises a central office 32. The central office 32 comprises a routing terminal 14, known as the central office terminal, and a switch 34 that communicate with each other over lines 36. The switch 34 may comprise one or more switches and, for multiple switches, a splitter to separate the data based on data type. For example, the switch 34 may comprise a voice switch for routing telephone calls to the Public Switched Telephone Network and an ATM switch/router to direct traffic to appropriate Internet Service providers. It will be understood that the switch 34 may comprise any other suitable combination of switches and related hardware and/or software for communicating voice, audio, video or other data between one of the local connections 30 and a remote destination.

In accordance with the ring architecture, a primary stream of traffic is provided between routing terminals 14 over lines 40. A redundant secondary traffic stream is provided between routing terminals 14 over lines 50 in the opposite direction. Thus, each routing terminal 14 may communicate with each other routing terminal 14 over lines 40 or lines 50. For example, in the event of a failure between two routing terminals 14 such as indicated by failure line 60, communication between routing terminals 14 may be switched to utilize either or both of the primary traffic stream on lines 40 and the redundant secondary traffic stream on lines 50. In this way, a single failure will not prevent communication.

The traffic streams provided on lines 40 and 50 each comprise a plurality of sub-streams of traffic. According to one embodiment, each line 40 and 50 comprises a plurality of virtual lines corresponding to the plurality of sub-streams. According to one embodiment, the lines 40 and 50 may each comprise a SONET OC-Nc connection, and the lines corresponding to the sub-streams may each comprise an ATM virtual path connection.

In operation, after receiving data from an adjacent routing terminal 14, each routing terminal 14 adds to the traffic stream any data signals received from the corresponding local connection 28 over line 30 and drops from the traffic stream data signals for which the corresponding local connection 28 is identified as the destination. Thus, the data signals which are dropped are routed to the local connection 28.

As described in more detail below in connection with FIG. 3, the east circuit pack 22 may decide to drop the data from the primary traffic stream received on line 40 or may decide to notify the west circuit pack 24 to drop the data from the secondary traffic stream received on line 50. Additionally, the east circuit pack 22 may drop a portion of the data corresponding to a subset of the sub-streams and notify the west circuit pack 24 to drop another portion of the data corresponding to the remaining sub-streams. The determination regarding which circuit pack 22 or 24 should drop which data is made in accordance with a priority level associated with the type of data being dropped and is based on the quality of the data on lines 40 and 50.

The data signals for the non-dropping circuit pack 22 or 24 which identify the corresponding local connection 28 as a destination are removed from the traffic stream and discarded. As described in more detail below, the circuit packs 22 and 24 comprise the same components and, thus, the functionality of the circuit packs 22 and 24 may be exchanged based on operating conditions.

Figure 2:
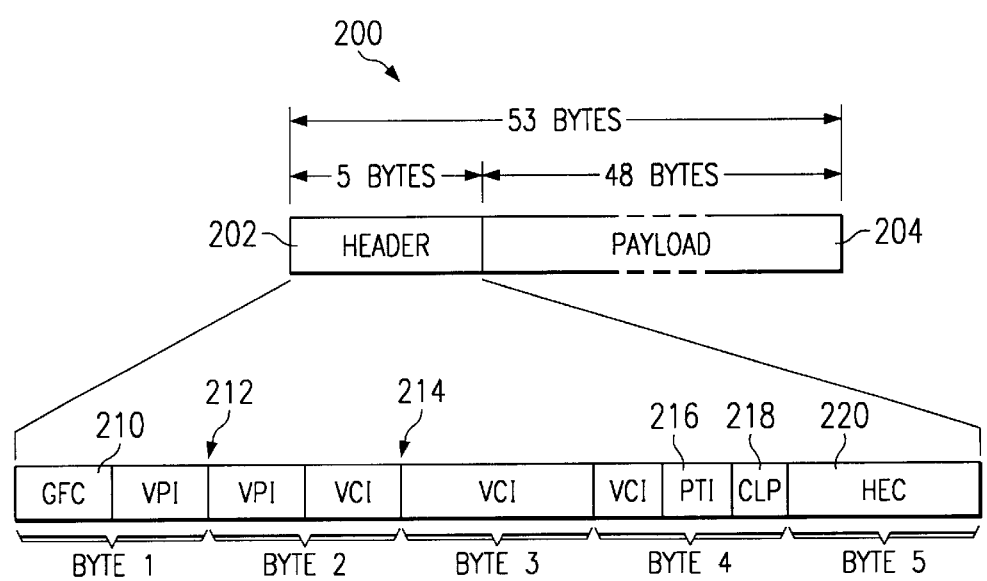
FIG. 2 is a block diagram illustrating a cell structure for providing communication within the ATM network of FIG. 1 in accordance with one embodiment of the present invention.

FIG. 2 is a block diagram illustrating a cell structure 200 for providing communication within the ATM network 10 in accordance with one embodiment of the present invention. ATM technology supports high-speed interfaces in a single data transmission and switching fabric and also supports the multiplexing of a plurality of data types. ATM is a connection-oriented data transmission technology in which data is passed from one location to another in the form of cells. Using ATM technology, a message may be segmented into a number of smaller messages which are each included in a cell. Each cell may then be passed separately to the destination where the smaller messages are eventually reassembled into the original message.

As each cell reaches a node, such as a routing terminal 14, on the way to a destination, an ATM switch in the node reads information from the cell and forwards the cell to another node based on that information. Thus, each ATM cell has a cell structure 200 that includes both a message segment and the routing information. The routing information is included in a header 202 for the cell, and the message segment is included in a payload 204 for the cell.

The cell structure 200 comprises 53 bytes, with the header 202 comprising 5 bytes and the payload 204 comprising 48 bytes. The first four bits of the first byte in the header 202 comprises a generic flow control field 210, the second four bits of the first byte and the first four bits of the second byte comprise a virtual path identifier field 212, the second four bits of the second byte, the third byte and the first four bits of the fourth byte comprise a virtual channel identifier field 214, the next three bits of the fourth byte comprise a payload type identifier field 216, the last bit of the fourth byte comprises a cell loss priority field 218, and the fifth byte comprises a header error check field 220.

The generic flow control field 210 is used to alleviate short term overload conditions when ATM traffic is passed through a user-to-network interface (UNI). For a network-to-network interface (NNI), the generic flow control field 210 may be used to define a larger virtual path identifier field 212 for trunking purposes.

The virtual path identifier field 212 may be set to all zeros for an idle cell in which the payload 204 contains no information. Otherwise, the virtual path identifier field 212 provides a way to bundle ATM traffic that is being sent to the same destination. According to one embodiment, the virtual path identifier corresponds to one of the sub-streams provided over line 40 or 50.

Generally, the virtual channel identifier field 214 identifies a specific virtual channel connection (VCC). However, the virtual channel identifier field 214 may be set to all zeros for an idle cell. Additionally, non-zero values may be used in this field 214 for an idle cell to communicate certain predetermined messages. For example, the combination of a value of zero in the virtual path identifier field 212 with a value of five in the virtual channel identifier field 214 may be used for ATM signaling purposes when requesting an ATM connection. It will be understood that other suitable predetermined messages may be provided by other non-zero values in the virtual channel identifier field 214 for an idle cell.

The payload type identifier field 216 identifies the type of payload 204 for the cell. For example, the payload type may be user data or network management data. It will be understood that other suitable types of data may be identified in the payload type identifier field 216 without departing from the scope of the present invention.

The cell loss priority field 218 is used to indicate the relative importance of the cell. For example, the bit may be set to 1 to indicate that a cell may be discarded, if necessary, such as when an ATM switch is experiencing traffic congestion. If the cell should not be discarded, such as when supporting a specified or guaranteed quality of service (QoS), the bit may be set to zero.

The header error check field 220 comprises a cyclic redundancy check computed on all fields 210, 212, 214, 216, and 218 in an ATM UNI/NNI cell header 202. The header error check field 220 detects all single bit errors and certain multiple bit errors. Thus, the header error check field 220 provides protection against incorrect message delivery due to addressing errors.

Figure 3:
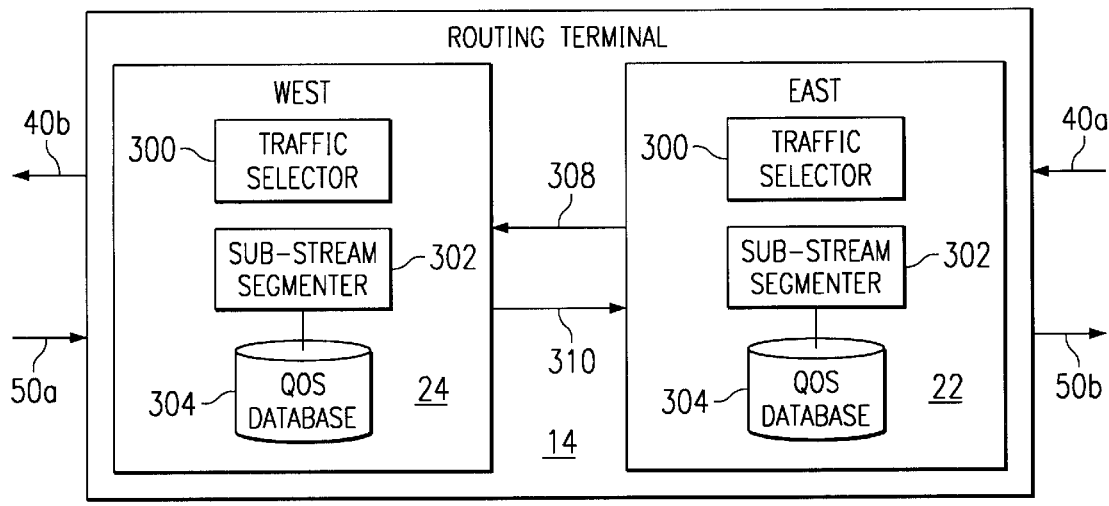
FIG. 3 is a block diagram illustrating one embodiment of the routing terminal of FIG. 1.

FIG. 3 is a block diagram illustrating one embodiment of the routing terminal 14. The routing terminal 14 comprises an east circuit pack 22 for receiving the primary traffic stream on an incoming line 40a and for transmitting the secondary traffic stream on an outgoing line 50b. The routing terminal 14 also comprises a west circuit pack 24 for receiving the secondary traffic stream on an incoming line 50a and for transmitting the primary traffic stream on an outgoing line 40b. The secondary traffic stream is redundant in that it provides back-up traffic to be used in the event of a failure or other problem with delivering the primary traffic stream.

After receiving the traffic stream, the routing terminal 14 adds to the traffic stream data signals from the corresponding local connection 28 and drops from the traffic stream data signals for the corresponding local connection 28 before transmitting the resulting traffic stream to an adjacent routing terminal 14 on lines 40b and 50b. Thus, the resulting traffic stream transmitted by the routing terminal 14 comprises both the traffic added from the local connection 28 and traffic being passed through that is destined for another local connection 28 or the central office 32.

The traffic streams received on lines 40a and 50a each comprise a plurality of sub-streams of different traffic types. For example, the traffic stream may comprise a combination of voice traffic, video traffic and data traffic. It will be understood that the traffic stream may include any suitable combination of voice, video, audio, data, or other types of traffic without departing from the scope of the present invention. Each primary sub-stream has a corresponding, redundant secondary sub-stream for back-up, as previously described. Thus, each routing terminal 14 receives two instances of each message that is routed to the corresponding local connection 28.

Each sub-stream of traffic has an associated priority level based on a class of service, which may be defined by a QoS for the sub-stream. For example, according to an exemplary embodiment, the QoS for a sub-stream may be constant bit rate (CBR), variable bit rate (VBR), available bit rate (ABR) or unspecified bit rate (UBR). It will be understood that a sub-stream may have any other suitable QoS without departing from the scope of the present invention. For the exemplary embodiment, sub-streams having a QoS of CBR are the highest priority traffic, followed by sub-streams having a QoS of VBR, then ABR and finally UBR, which is the lowest priority.

The sub-streams may include any suitable combination of traffic types and priority levels. For example, the traffic stream may comprise a voice traffic sub-stream with a QoS of CBR, a video traffic sub-stream with a QoS of CBR, a video traffic sub-stream with a QoS of VBR, a data traffic sub-stream with a QoS of ABR, and a data traffic sub-stream with a QoS of UBR. It will be understood that the traffic stream may include any suitable number of substreams.

Returning to FIG. 3, the circuit packs 22 and 24 each comprise a traffic selector 300, a sub-stream segmenter 302, and a QoS database 304. The circuit packs 22 and 24 communicate with each other over lines 308 and 310. Lines 308 and 310 may comprise a bus on a backplane. Each circuit pack 22 and 24 stores in its QoS database 304 a QoS with an associated priority level for each sub-stream received by that circuit pack 22 or 24. Thus, in the event of a failure, a sub-stream segmenter 302 may segment the sub-streams based on their associated priority levels as determined by the data in the QoS database 304. The substreams within the highest priority segment may then be processed before the other sub-streams. In accordance with one embodiment, the sub-stream segmenter 302 segments only those sub-streams that are to be dropped by the routing terminal 14 to the corresponding local connection 28. The QoS databases 304 provide the circuit packs 22 and 24 with fast access to the stored information, allowing the protection switching to be completed within the allotted time.

For the exemplary embodiment, the sub-stream segmenter 302 generates a first segment comprising the voice and video traffic sub-streams with a QoS of CBR, a second segment comprising the video traffic sub-stream with a QoS of VBR, a third segment comprising the data traffic substream with a QoS of ABR, and a fourth segment comprising the data traffic sub-stream with a QoS of UBR. Thus, each segment comprises one or more sub-streams having the same priority level. In this embodiment, the first segment has the highest priority level, followed in order by the second, third and fourth segments. Thus, as described below, the first segment is processed first in the event of a failure.

In an exemplary embodiment, the east circuit pack 22 detects a failure on line 40. It will be understood that the present invention may be used in the same manner when the west circuit pack 24 detects a failure on line 50. The failure may be due to a faulty connection, a complete break in the connection, or any other problem that may reduce the quality of the signal being provided on line 40 or 50. For the exemplary embodiment, the sub-stream segmenter 302 for the east circuit pack 22 segments the ingress primary sub-streams into a plurality of segments based on the priority levels stored in the QoS database 304, as described above. The east circuit pack 22 then provides a status indicator for each ingress primary sub-stream in the highest priority segment to the west circuit pack 24 over line 308. The status indicator comprises a relative value associated with the status of the incoming line 40a that delivers the primary sub-stream.

The traffic selector 300 for the west circuit pack 24 then compares the status indicators for the primary substreams from the east circuit pack 22 to the status indicators for the corresponding ingress secondary substreams to determine which sub-streams have a higher quality. For each secondary sub-stream having a status indicator greater than or equal to the status indicator for the corresponding primary sub-stream, the traffic selector 300 allows the west circuit pack 24 to drop the secondary sub-stream to the local connection 28. For each primary sub-stream having a status indicator greater than the status indicator for the corresponding secondary substream, the traffic selector 300 sends a notice over line 310 to the east circuit pack 22 to drop the primary substream to the local connection 28.

In accordance with an alternative embodiment of the present invention, both circuit packs 22 and 24 segment the sub-streams into a plurality of segments based on the priority levels stored in the QoS databases 304. The circuit packs 22 and 24 then provide status indicators for each sub-stream in each segment in order of the segment priority levels to a common card accessible by both circuit packs 22 and 24. A traffic selector for the common card then compares the status indicators for the primary substreams from the east circuit pack 22 to the status indicators for the corresponding secondary sub-streams from the west circuit pack 24 to determine which sub-streams have a higher quality. The common card then sends a notice to the east circuit pack 22 to drop the higher quality primary sub-streams and to the west circuit pack 24 to drop the higher quality secondary sub-streams.

Thus, whether the determination is made by the west circuit pack 24 or a common card, the sub-stream received over the line 40a or 50a having a higher status indicator is dropped by the routing terminal 14, thereby ensuring that the higher quality signal is used. When a complete failure such as a line break occurs, therefore, the ring continues to operate properly as all of the sub-streams from the functioning line 40a or 50a are dropped and none of the sub-streams from the non-functioning line 40a or 50a are dropped.

After the highest priority segment is processed, the sub-stream segmenter 302 for the east circuit pack 22 sends the next highest segment of primary sub-stream status indicators to the west circuit pack 24 for the traffic selector 300 to evaluate. In this embodiment, the status indicators for the second segment are evaluated next. This process continues until the lowest priority segment has been processed, which in the exemplary embodiment is the fourth segment.

Thus, the highest priority segments are processed first and those segments with lower priorities are processed later. In this way, the highest priority segments may be processed within the stricter time requirements for high priority traffic, such as voice traffic, while the lower priority segments are processed within the more relaxed time requirements for low priority traffic, such as some types of data traffic. This results in a substantial increase in the number of traffic streams that can be concurrently supported by the network 10 while the protection switching requirements are maintained for the high priority traffic.

Figure 4:
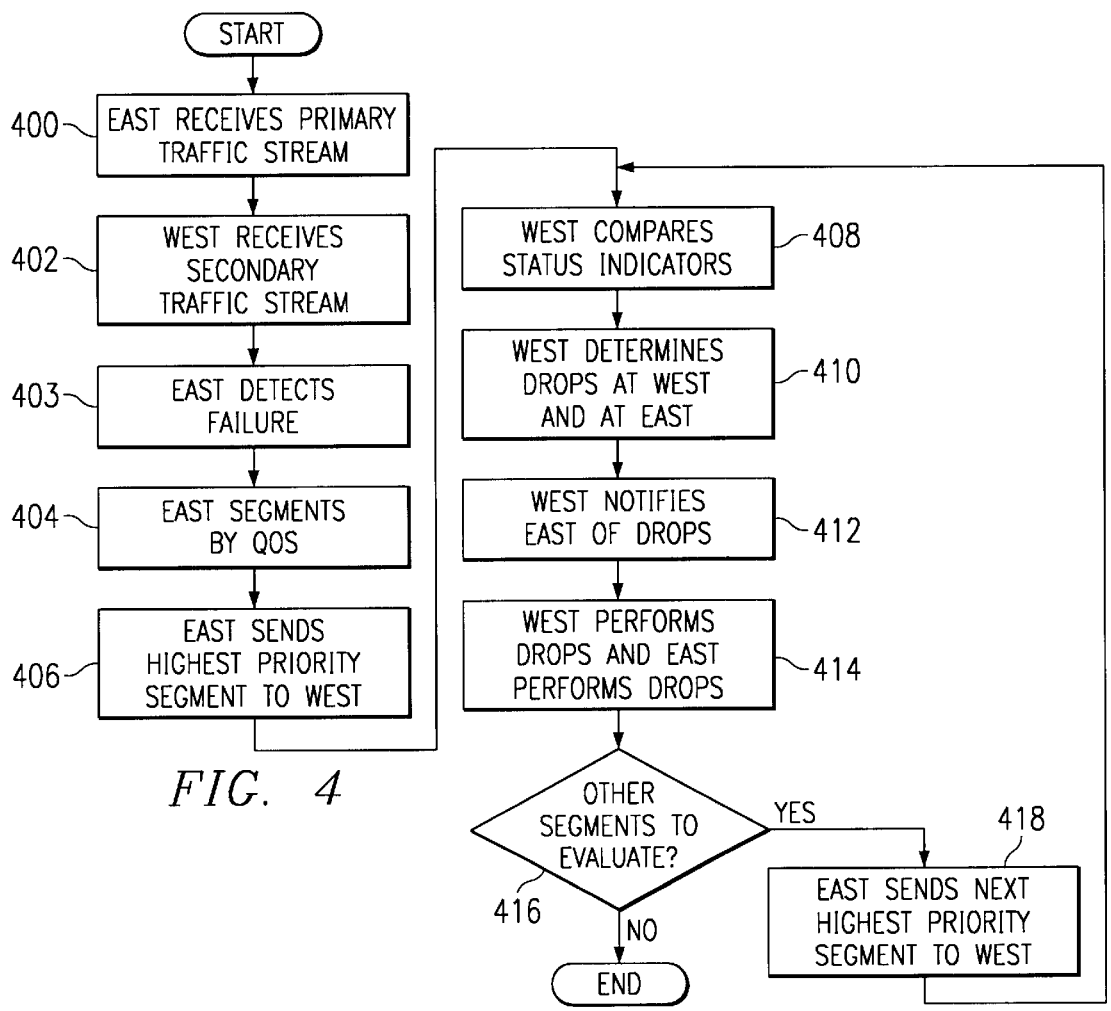
FIG. 4 is a flow diagram illustrating a method for protection switching in accordance with one embodiment of the present invention.

FIG. 4 is a flow diagram illustrating a method for protection switching in accordance with one embodiment of the present invention. According to the described embodiment, the east circuit pack 22 detects a failure. It will be understood, however, that the method may also be used when the west circuit pack 24 detects a failure. In this situation, the functionality of the circuit packs 22 and 24 is exchanged. The method begins at step 400 where the east circuit pack 22 receives a primary traffic stream on line 40. In step 402, the west circuit pack 24 receives a secondary traffic stream on line 50.

In step 403, the east circuit pack 22 detects a failure, or a reduced quality signal, on line 40. In step 404, the east circuit pack 22 segments the primary substreams into a plurality of segments based on the QoS for the sub-streams. In accordance with one embodiment, the east circuit pack 22 segments those sub-streams that are to be dropped by the routing terminal 14 to the corresponding local connection 28. The east circuit pack 22 sends the segment of primary sub-streams with the highest priority QoS to the west circuit pack 24 in step 406.

In step 408, the west circuit pack 24 compares the status indicator for each primary sub-stream in the segment received from the east circuit pack 22 to the status indicator for the corresponding secondary sub-stream. Based on which status indicator is greater, the west circuit pack 24 decides which sub-streams to drop from the primary traffic stream at the east circuit pack 22 and which sub-streams to drop from the secondary traffic stream at the west circuit pack 24 in step 410. In step 412, the west circuit pack 24 notifies the east circuit pack 22 which primary sub-streams to drop. In step 414, the west circuit pack 24 drops the secondary sub-streams for which the status indicators are greater than or equal to those for the primary sub-streams, and based on the notification from the west circuit pack 24, the east circuit pack 22 drops the primary sub-streams for which the status indicators are greater than those for the secondary substreams.

At decisional step 416, the east circuit pack 22 determines whether or not there are other segments to evaluate. If there are no other segments to evaluate, the method follows the No branch from decisional step 416 and comes to an end. If there are other segments to evaluate, the method follows the Yes branch from decisional step 416 to step 418 where the east circuit pack 22 sends the segment of primary sub-streams having the next highest priority QoS to the west circuit pack 24. The method then returns to step 408 where the west circuit pack 24 compares the status indicator for each primary sub-stream in the segment received from the east circuit pack 22 to the status indicator for the corresponding secondary substream, and the method continues as before until the east circuit pack 22 determines that there are no other segments to evaluate in decisional step 416.

Thus, time-critical traffic is processed first in order to meet time requirements for switching. Other traffic with less strict time requirements is processed afterward. This switching in accordance with traffic priority results in the ability to concurrently support an increased number of traffic flows.

Although the present invention has been described with several embodiments, various changes and modifications may be suggested to one skilled in the art. It is intended that the present invention encompasses such changes and modifications as fall within the scope of the appended claims.

What is claimed is:

1. A method for protection switching in a telecommunications network, comprising:
   receiving a plurality of primary and secondary sub-streams, each primary sub-stream corresponding to a redundant secondary sub-stream, each sub-stream having an associated priority level; and
   providing protection switching for the substreams based on the priority levels.

2. The method of claim 1, providing protection switching comprising segmenting at least a portion of the primary sub-streams into a plurality of segments based on the priority levels.

3. The method of claim 2, providing protection switching further comprising processing a high priority segment prior to processing a low priority segment, processing a segment comprising:
   comparing the (status indicator) for each primary sub-stream in the segment to the status indicator for the corresponding secondary sub-stream; and
   dropping from the segment each primary sub-stream having a status indicator greater than the status indicator for the corresponding secondary sub-stream.

4. The method of claim 3, processing a segment further comprising dropping each secondary sub-stream having a status indicator greater than or equal to the status indicator for the corresponding primary sub-stream in the segment.

5. The method of claim 1, providing protection switching further comprising:
   storing the priority level for each of the primary sub-streams in a primary database; and
   storing the priority level for each of the secondary sub-streams in a secondary database.

6. The method of claim 1, the telecommunications network comprising an Asynchronous Transfer Mode network.

7. The method of claim 1, the sub-streams comprising at least one of voice traffic, video traffic and data traffic.

8. The method of claim 1, the priority levels comprising at least one of constant bit rate, variable bit rate, available bit rate and unspecified bit rate.

9. A system for protection switching in a telecommunications network, comprising:
   a computer-readable medium; and
   logic stored on the computer-readable medium, the logic operable to receive a plurality of primary and secondary sub-streams, each primary sub-stream corresponding to a redundant secondary sub-stream, each sub-stream having an associated priority level, and to provide protection switching for the sub-streams based on the priority levels.

10. The system of claim 9, the logic further operable to segment at least a portion of the primary sub-streams into a plurality of segments based on the priority levels.

11. The system of claim 10, the logic further operable to process a segment by comparing the status indicator for each primary sub-stream in the segment to the status indicator for the corresponding secondary substream, dropping from the segment each primary sub-stream having a status indicator greater than the status indicator for the corresponding secondary sub-stream, and dropping each secondary sub-stream having a status indicator greater than or equal to the status indicator for the corresponding primary sub-stream in the segment.

12. The system of claim 11, the logic further operable to process a high priority segment prior to processing a low priority segment.

13. The system of claim 9, the logic further operable to store the priority level for each of the primary substreams in a primary database and to store the priority level for each of the secondary sub-streams in a secondary database.

14. The system of claim 9, the telecommunications network comprising an Asynchronous Transfer Mode network.

15. The system of claim 9, the sub-streams comprising at least one of voice traffic, video traffic and data traffic.

16. The system of claim 9, the priority levels comprising at least one of constant bit rate, variable bit rate, available bit rate and unspecified bit rate.

17. A system for protection switching in a telecommunications network, comprising:
   a routing terminal comprising an east circuit pack and a west circuit pack;
   a primary line operable to deliver a primary traffic stream to the east circuit pack, the primary traffic stream comprising a plurality of primary sub-streams each having an associated priority level and an associated status indicator;
   a secondary line operable to deliver a secondary traffic stream to the west circuit pack, the secondary traffic stream comprising a plurality of secondary sub-streams each having an associated priority level and an associated status indicator, each primary sub-stream corresponding to a redundant secondary sub-stream; and
   the routing terminal further comprising:
      a sub-stream segmenter operable to segment the sub-streams into a plurality of segments based on the priority levels for the sub-streams, each segment comprising sub-streams having a same priority level, and
      a traffic selector operable to compare, for each segment, the status indicator for each primary sub-stream in the segment to the status indicator for the corresponding secondary sub-stream in accordance with the priority level for the sub-streams of the segment.

18. The system of claim 17, the traffic selector further operable to notify the east circuit pack to drop each primary sub-stream having a status indicator greater than the status indicator for the corresponding secondary sub-stream.

19. The system of claim 17, the traffic selector further operable to allow the west circuit pack to drop each secondary sub-stream having a status indicator greater than or equal to the status indicator for the corresponding primary sub-stream.

20. The system of claim 17, further comprising:
   a primary database coupled to the east circuit pack and operable to store the priority level for each of the primary sub-streams; and
   a secondary database coupled to the west circuit pack and operable to store the priority level for each of the secondary sub-streams.

21. A routing terminal operable to provide protection switching in a telecommunications network, comprising:
   an east circuit pack operable to receive a primary traffic stream, the primary traffic stream comprising a plurality of primary sub-streams each having an associated priority level and an associated status indicator;
   a west circuit pack operable to receive a secondary traffic stream, the secondary traffic stream comprising a plurality of secondary sub-streams each having an associated priority level and an associated status indicator;
   a sub-stream segmenter operable to segment the sub-streams into a plurality of segments based on the priority levels for the sub-streams;
   each segment comprising sub-streams having a same priority level, the priority level for the sub-streams of the first segment comprising the highest priority level; and
   a traffic selector operable to compare the status indicators for the primary sub-streams to the status indicators for the corresponding secondary sub-streams and operable to compare, for each segment, the status indicator for each primary sub-stream in the segment to the status indicator for the corresponding secondary sub-stream in accordance with the priority level for the sub-streams of the segment.

22. The routing terminal of claim 21, the traffic selector further operable to notify the east circuit pack to drop each primary sub-stream having a status indicator greater than the status indicator for the corresponding secondary sub-stream.

23. The routing terminal of claim 22, the traffic selector further operable to allow the west circuit pack to drop each secondary sub-stream having a status indicator greater than or equal to the status indicator for the corresponding primary sub-stream.

24. The routing terminal of claim 21, further comprising:
   a primary database coupled to the east circuit pack and operable to store the priority level for each of the primary sub-streams; and
   a secondary database coupled to the west circuit pack and operable to store the priority level for each of the secondary sub-streams.

* * * * *

UNITED STATES PATENT AND TRADEMARK OFFICE
CERTIFICATE OF CORRECTION

PATENT NO.     : 6,674,755 B1                                        Page 1 of 1
DATED          : January 6, 2004
INVENTOR(S)    : Thomas A. Potter et al.

It is certified that error appears in the above-identified patent and that said Letters Patent is hereby corrected as shown below:

Title page,
Item [56], References Cited, OTHER PUBLICATIONS, after "No." delete "09/452,751" and insert -- 09/452,828 --; after "09/452,828", delete "ENTITLED" and insert -- entitled --; after "entitled" delete "Synchronous Switch and" and insert -- Time Slot Interchanger (TSI) and --; after "1999" delete "119" and insert -- 117 --; and after "pages." delete "(0372)" and insert -- (0373) --.

Column 8,
Line 50, after "the" delete "substreams" and insert -- sub-streams --.
Line 60, after "the" delete "(status indicator)" and insert -- status indicator .

Column 9,
Line 32, after "secondary" delete "substream" and insert -- sub-stream --.
Line 43, after "primary" delete "substream" and insert -- sub-stream --.

Signed and Sealed this

Eighth Day of June, 2004

JON W. DUDAS
*Acting Director of the United States Patent and Trademark Office*